(12) United States Patent
van Willigenburg (10) Patent No.: US 9,154,844 B2
(45) Date of Patent: Oct. 6, 2015

(54) METHOD AND APPARATUS FOR REDUCING DELAYS DUE TO CHANNEL CHANGES

(75) Inventor: Willem van Willigenburg, Hilversum (NL)

(73) Assignee: Alcatel Lucent, Boulogne-Billancourt (FR)

( * ) Notice: Subject to any disclaimer, the term of this patent is extended or adjusted under 35 U.S.C. 154(b) by 1919 days.

(21) Appl. No.: 11/554,062

(22) Filed: Oct. 30, 2006

(65) Prior Publication Data

US 2008/0115182 A1    May 15, 2008

(51) Int. Cl.
| | |
|---|---|
| G06F 3/00 | (2006.01) |
| G06F 13/00 | (2006.01) |
| H04N 5/445 | (2011.01) |
| H04N 21/475 | (2011.01) |
| H04N 21/2343 | (2011.01) |
| H04N 21/438 | (2011.01) |
| H04N 21/442 | (2011.01) |

(52) U.S. Cl.
CPC ....... *H04N 21/4755* (2013.01); *H04N 21/2343* (2013.01); *H04N 21/4383* (2013.01); *H04N 21/4384* (2013.01); *H04N 21/442* (2013.01)

(58) Field of Classification Search
CPC .......... H04N 21/2343; H04N 21/4383; H04N 21/4384; H04N 21/442; H04N 21/4755
USPC .......................................... 348/731; 725/110
See application file for complete search history.

(56) References Cited

U.S. PATENT DOCUMENTS

| | | | | |
|---|---|---|---|---|
| 5,754,939 | A * | 5/1998 | Herz et al. ................... | 455/3.04 |
| 6,115,080 | A * | 9/2000 | Reitmeier ..................... | 348/731 |
| 6,141,033 | A * | 10/2000 | Michael et al. ................. | 348/25 |
| 6,275,616 | B1 * | 8/2001 | Jahanghir et al. ............. | 382/233 |
| 6,859,495 | B1 * | 2/2005 | Poon et al. ................ | 375/240.21 |
| 6,934,917 | B2 * | 8/2005 | Lin ................................ | 715/811 |
| 2003/0236906 | A1 * | 12/2003 | Klemets et al. ............... | 709/231 |

(Continued)

FOREIGN PATENT DOCUMENTS

| | | |
|---|---|---|
| EP | 1 233 591 A2 | 8/2002 |
| EP | 1 830 540 | 9/2007 |

(Continued)

OTHER PUBLICATIONS

International Search Report and Written Opinion of the International Searching Authority dated Oct. 2, 2009 in PCT/US2007/021610, Lucent Technologies Inc., Applicant, 12 pages.
Feb. 29, 2012 Office Action in CN 200780040505.9, Lucent Technologies Inc., Applicant, 5 pages.
EP Communication Pursuant to Article 94(3) EPC Examination, Jul. 16, 2014, from corresponding EP 07 852 613.4, 5 pages total.

*Primary Examiner* — Joshua Taylor
(74) *Attorney, Agent, or Firm* — Wall & Tong, LLP (57) ABSTRACT

The invention includes a method and apparatus for providing programs to a client device. The method includes providing a first video program stream over a first channel where the first video program stream conveys a first video program having a first quality level, and providing a plurality of second video program streams over a second channel where each of the second video program streams conveys a second video program having a second quality level below the first quality level. The first video program stream and second video program streams are adapted for use by the client device in locally switching from presenting the first video program at the first quality level to presenting a selected one of the second video programs at the second quality level.

12 Claims, 6 Drawing Sheets

(56) References Cited

U.S. PATENT DOCUMENTS

| | | | |
|---|---|---|---|
| 2004/0013192 A1* | 1/2004 | Kennedy | 375/240 |
| 2004/0031053 A1 | 2/2004 | Lim et al. | |
| 2005/0078757 A1* | 4/2005 | Nohrden | 375/240.28 |
| 2005/0108406 A1* | 5/2005 | Lee et al. | 709/228 |
| 2006/0117341 A1* | 6/2006 | Park | 725/34 |
| 2006/0140276 A1* | 6/2006 | Boyce et al. | 375/240.21 |
| 2006/0294540 A1* | 12/2006 | Perlman | 725/31 |

FOREIGN PATENT DOCUMENTS

| | | |
|---|---|---|
| WO | WO 02/101559 A1 | 12/2002 |
| WO | WO 2004/036868 A1 | 4/2004 |

* cited by examiner

METHOD AND APPARATUS FOR REDUCING DELAYS DUE TO CHANNEL CHANGES

FIELD OF THE INVENTION

The invention relates to the field of communication networks and, more specifically, to video distribution networks.

BACKGROUND OF THE INVENTION

In existing video program distribution networks, a channel change request (for switching between television channels) initiated by a user at a client device may be communicated from the client device to a video server that is the source of the television channels. In response to the channel change request, the video server identifies the requested television channel and begins streaming the video program shown on the requested television channel. Due to network delay associated with the propagation of the channel change request from the client device to the video server, as well as network delay associated with distribution of the video stream of the requested channel from the video server to the client device, the user experiences a delay (known as a "zapping" delay) before the program associated with the requested television channel is presented to the user. This delay is exacerbated when the user switches between television channels in rapid succession.

In an attempt to reduce the delay experienced by users during channel change operations, some video program providers cache video content within the video program distribution network. Disadvantageously, however, network caching solutions provide only slight improvements in the delay experienced by the user during a channel change operation. Furthermore, such network caching solutions are expensive in terms of the network storage required to cache numerous video programs, as well as in terms of network resources consumed in continuously updating the video content cached within the video program distribution network, and are not tailored to the preferences of the individual users. Moreover, other solutions that attempt to reduce the delay experienced by users during channel change operations also provide only slight improvements in the delay experienced by the user during a channel change operation.

SUMMARY OF THE INVENTION

Various deficiencies in the prior art are addressed through the invention of a method and apparatus for providing programs to a client device. The method includes providing a first video program stream over a first channel where the first video program stream conveys a first video program having a first quality level, and providing a plurality of second video program streams over a second channel where each of the second video program streams conveys a second video program having a second quality level below the first quality level. The first video program stream and second video program streams are adapted for use by the client device in locally switching from presenting the first video program at the first quality level to presenting a selected one of the second video programs at the second quality level.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides, from a video server to a client device, a high-quality video program over a first channel and one or more low-quality video programs over a second channel. By providing the low-quality video programs in addition to the high-quality video program, the present invention thereby enables faster switching between video programs (i.e., faster channel change operations) and, thus, a more enjoyable user experience, because switching between selected ones of the low-quality video programs can be performed locally by the client device without upstream communication from the client device to the video server. Since the low-quality video programs are provided at a level of quality below the level of quality of the high-quality video program, improved user experience is provided without consuming significant additional network resources.

Figure 1:
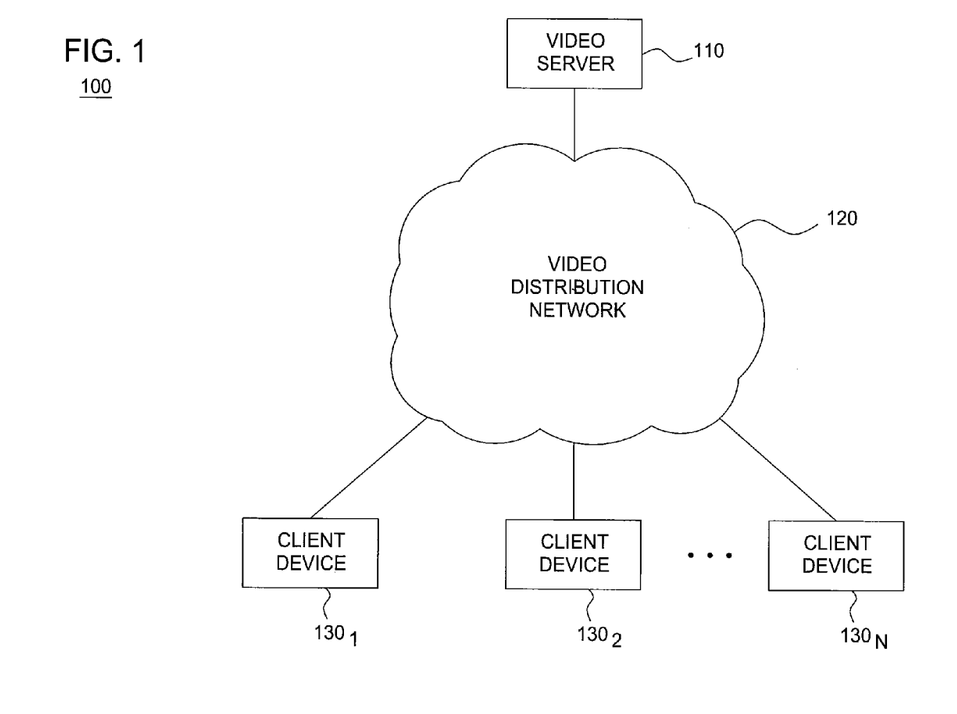
FIG. 1 depicts a high-level block diagram of a communication network.

FIG. 1 depicts a high-level block diagram of a communication network. Specifically, communication network 100 of FIG. 1 includes a video server (VS) 110, a video distribution network (VDN) 120, and a plurality of client devices (CDs) $130_1$-$130_N$ (collectively, CDs 130). The VS 110 communicates with CDs 130 using VDN 120. The CDs 130 communicate with VS 110 using VDN 120. Although depicted and described herein with respect to a specific communication network, various other communication networks may be used in accordance with the present invention. Although primarily depicted and described herein with respect to video distribution, other forms of content may be distributed in accordance with the present invention.

As depicted in FIG. 1, VS 110 is adapted for establishing one or more video channels between VS 110 and each of CDs 130. The VS 110 is adapted for providing one or more video program streams to CDs 130 using each video channel established between VS 110 and each of CDs 130. In one embodiment, VS 110 provides at least a portion of the video program streams to CDs 130 in response to requests for video programs (e.g., in response to channel change requests) received from CDs 130. The VS 110 is adapted for receiving and storing user preference information from CDs 130, where user preference information received from each CD 130 is associated with one or more users of that CD 130. The VS 110 is further adapted for providing one or more video program streams to each CD 130 according to at least a portion of the user preference information received and stored for user(s) of that CD 130.

As depicted in FIG. 1, VDN 120 is adapted for conveying information downstream from VS 110 to CDs 130. The VDN 120 is adapted for supporting video channels between VS 110 and CDs 130. The VDN 120 is adapted for conveying video program streams from VS 110 to CDs 130 using video channels established between VS 110 and CDs 130. The VDN 120 is adapted for conveying information upstream from CDs 130 to VS 110. The VDN 120 is adapted for conveying various information from CDs 130 to VS 110, such as video program selection information (e.g., in response to a channel change operation initiated by users via CDs 130), user preference information, and the like. The VDN 120 may be implemented as any network, or combination of networks, adapted for conveying video program streams and associated information, such as Internet Protocol (IP) networks, hybrid fiber coaxial (HFC) cable networks, and the like, as well as various combinations thereof.

As depicted in FIG. 1, CDs 130 include devices adapted for receiving video program streams from VS 110, processing the video program streams to extract the video programs for presentation to associated users of CDs 130 and presenting the extracted video programs to users of CDs 130. The CDs 130 include devices adapted for receiving input selections and commands from associated users, processing such input selections and commands, and performing various tasks in response to such input selections and commands. In one embodiment, at least a portion of such tasks may be performed locally by CDs 130 (e.g., switching from selecting a video program stream of a first video channel to selecting one or more video program streams of a second video channel). In one embodiment, at least a portion of such tasks include tasks requiring communication with VS 130 (e.g., initiating video channel change requests, updating user preference information maintained by VS 130, and the like, as well as various combinations thereof).

As depicted in FIG. 1, CDs 130 include communication components (e.g., receivers, transmitters, modems, and the like, as well as various combinations thereof). The CDs 130 include user interaction components (e.g., remote controls, keyboards, and the like, as well as various combinations thereof). The CDs 130 include video presentation components (e.g., video displays, speakers, and the like, as well as various combinations thereof), and the like, as well as various combinations thereof. For example, CDs 130 may include devices such as televisions (including external and/or internal set-top terminal capabilities), computers, and the like, as well as various combinations thereof. Although primarily described herein with respect to specific client devices and associated client device capabilities, any client device adapted for performing functions described herein may be used in accordance with the present invention.

Figure 2:
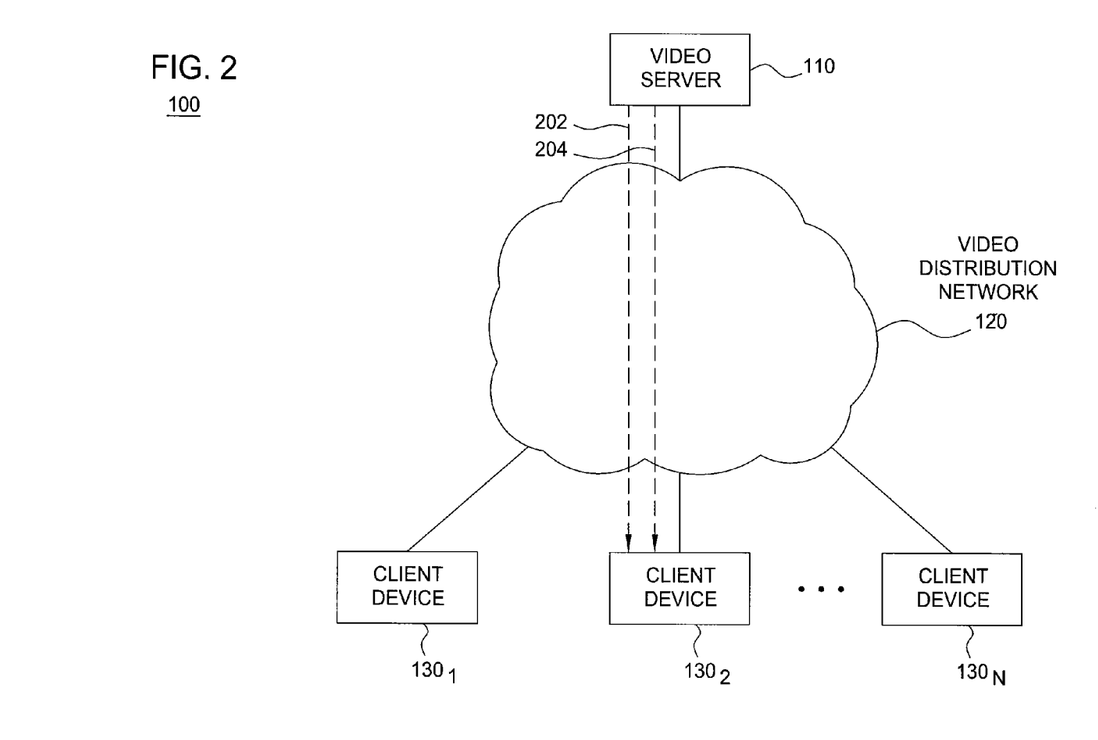
FIG. 2 depicts a high-level block diagram of a communication network supporting a high-quality channel conveying a high-quality video stream and a low-quality channel conveying one or more high-quality video streams.

FIG. 2 depicts a high-level block diagram of a communication network (illustratively, communication network 100 of FIG. 1). As depicted in FIG. 2, communication network 100 supports a high-quality channel (illustratively, high-quality channel 202) conveying a high-quality video program stream and a low-quality channel (illustratively, low-quality channel 204) conveying one or more low-quality video program streams. As depicted in FIG. 2, high-quality channel 202 conveys the high-quality video program stream from VS 110 to one of the CDs 130 (illustratively, CD $130_2$) and conveys the low-quality video program streams from VS 110 to that one of the CDs 130 (illustratively, CD $130_2$).

As depicted in FIG. 2, VS 110 is adapted for establishing a high-quality channel and a low-quality channel with each client device (illustratively, high-quality channel 202 and low-quality channel 204 established with CD $130_2$). The VS 110 is adapted for providing a high-quality video program stream over high-quality channel 202 and providing low-quality video program streams over low-quality channel 204. The VS 110 is adapted for providing a high-quality video program stream over high-quality channel 202 in response to a channel change request received from CD $130_2$. The VS 110 is adapted for providing low-quality video program streams over low-quality channel 204 using user preferences associated with a user associated with CD $130_2$. The operation of VS 110 may be better understood with respect to FIG. 3.

As depicted in FIG. 2, each CD 130 is adapted for supporting a high-quality video channel and a low-quality video channel from a video server (illustratively, high-quality video channel 202 and low-quality video channel 204 supported by CD $130_2$). As depicted in FIG. 2, each CD 130 is adapted for selecting a video program stream (i.e., the high-quality video program stream from the high-quality channel or one of the low-quality video program streams from the low-quality channel) and presenting the video program conveyed by the selected video program stream. As depicted in FIG. 2, each CD 130 is adapted for providing user preference information to VS 110 (for use by VS 110 in selecting low-quality video program streams to provide over the low-quality video channel). The operation of each CD 130 may be better understood with respect to FIG. 4.

As depicted in FIG. 2, high-quality channel 202 conveys a high-quality video stream from VS 110 to CD $130_2$. The high-quality video stream may be any level of quality above the quality of the low-quality video streams. The high-quality video stream conveys a video program in a high-quality format. For example, in one embodiment, in which the low-quality video streams are provided in below-standard definition (e.g., grayscale), the high-quality video stream may be provided in standard definition or high definition. For example, in one embodiment, in which the low-quality video streams are provided in standard definition the high-quality video stream may be provided in high definition. The high-quality video program stream provided by high-quality channel 202 conveys the video program requested by one or more users associated with CD $130_2$.

As depicted in FIG. 2, low-quality channel 204 conveys one or more low-quality video streams from VS 110 to CD $130_2$. The low-quality video streams convey low-quality video programs. The quality of the low-quality video stream may be any level of quality below the quality of the high-quality video stream. For example, in one embodiment, in which the high-quality video stream is provided in high definition, low-quality video streams may be provided in standard definition. For example, in one embodiment, in which the high-quality video stream is provided in standard definition, low-quality video streams may be provided in below-standard-definition (e.g., grayscale). The low-quality video program streams provided by low-quality channel 204 convey video programs determined according to user preference information associated with one or more users associated with CD $130_2$. The low-quality video program streams may be provided in any manner for providing multiple streams of information using a single channel.

Figure 3:
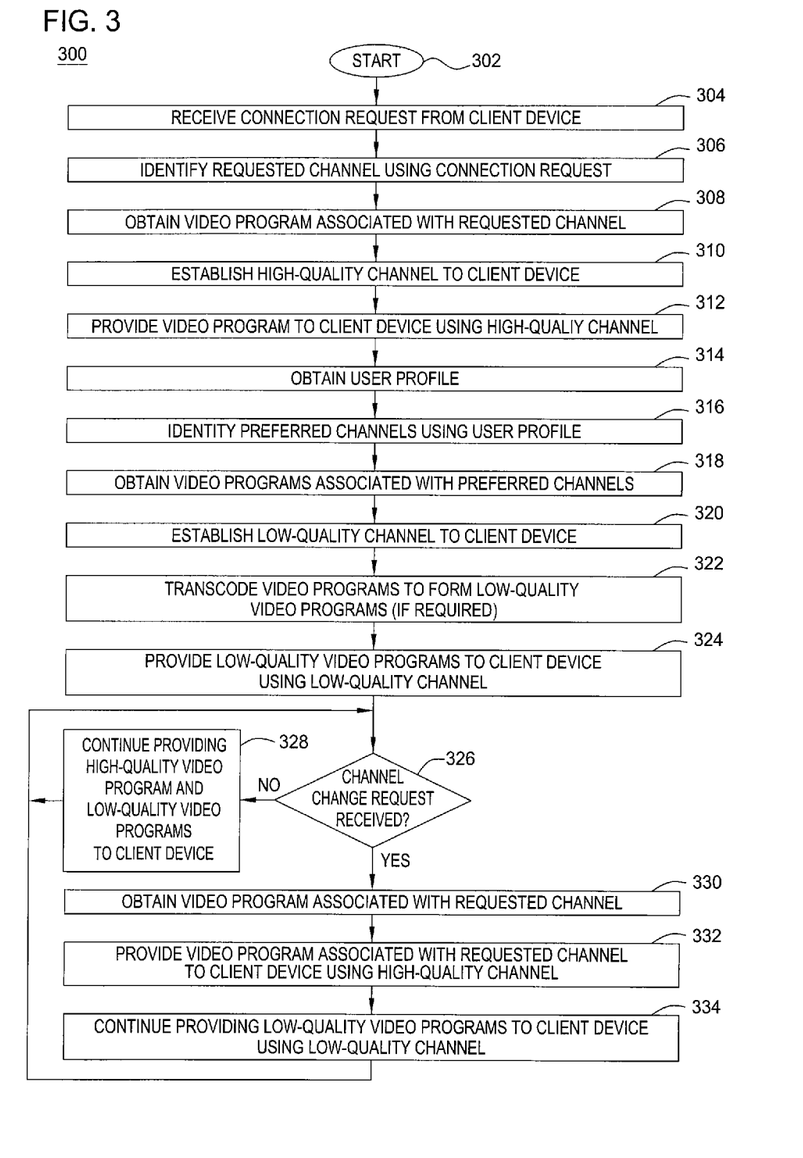
FIG. 3 depicts a method according to one embodiment of the present invention.

FIG. 3 depicts a method according to one embodiment of the present invention. Specifically, method 300 is a method for providing a high-quality video program stream and one or more low-quality video program streams from a video server to a client device. The low-quality video program streams enable users of the client device to preview additional video programs by selecting the low-quality video programs locally (i.e., without corresponding upstream requests from the client device to the video server). Although primarily depicted and described herein as being performed serially, at least a portion of the steps of method 300 may be performed contemporaneously, or in a different order than presented in FIG. 3. The method 300 begins at step 302 and proceeds to step 304.

At step 304, a connection request is received from the client device. In one embodiment, the connection request is received in response to the client device being powered on. In one embodiment, the connection request is received in response to an explicit request initiated by a user associated with the client device. At step 306, a requested channel is identified using the connection request. At step 308, a video program (i.e., a high-quality video program, which may also be referred to as a first video program) associated with the requested channel is obtained. At step 310, a high-quality channel (i.e., first channel) is established from the video server to the client device. At step 312, the high-quality video program (i.e., the video program stream obtained at step 308) is provided to the client device as a high-quality video program stream conveyed over the high-quality channel.

At step 314, a user profile is obtained. The user profile is associated with one or more users associated with the client device. The user profile is obtained using at least a portion of the connection request received from the client device (e.g., using one or more of a client device identifier, a user identifier, and the like, as well as various combinations thereof). Although primarily described with respect to a user profile, in one embodiment, a household profile (associated with one or more users and/or one or more client devices of a particular household) is obtained. Although primarily described with respect to a user profile, in one embodiment, a client device profile (associated with a client device irrespective of which user or users use the client device) may be obtained. In one embodiment, multiple profiles are stored (e.g., various combinations of household profiles, user profiles, client device profiles, and the like, as well as various combinations thereof), and in some cases linked, for use in providing low-quality video programs.

At step 316, one or more preferred channels (preferred by one or more users associated with the client device) are identified. In one embodiment, the one or more preferred channels are identified using the obtained user profile (or household profile, client device profile, or any other profile or combination of profiles storing such preferred channel information). In one embodiment, the preferred channels are television channels (e.g., ABC, NBC, CBS, and the like, as well as various combinations thereof). The preferred channels may be associated with the user profile (or other profile) using one or more methods for determining preferred channels (e.g., determined by the video server, determined by the client device (e.g., either automatically or from manual user configuration), and transmitted from the client device to the video server, and the like).

At step 318, one or more video programs associated with the one or more preferred channels, respectively, are obtained. At step 320, a low-quality channel (i.e., second channel) is established from the video server to the client device. At step 322, if necessary, the one or more video programs (i.e., video programs obtained at step 318) are transcoded to form low-quality video programs, respectively. In one embodiment, for example, the one or more video programs may be transcoded from a high-definition quality to standard-definition quality. In another embodiment, for example, the one or more video programs may be transcoded from a standard-definition quality to a below-standard-definition quality (e.g., to grayscale). At step 324, the one or more low-quality video programs (i.e., the video programs obtained at step 318, which may also be referred to as second video programs) are provided to the client device as low-quality video program streams conveyed over the low-quality channel.

At step 326, a channel change request is received from the client device. The channel change request may be received in response to a user of the client device initiating a channel change operation. The channel change request may be received in response to a channel selection operation which, as described herein, may be initiated automatically by the client device in response to a trigger condition (e.g., the client device presenting one of the low-quality video programs for a length of time greater than a threshold), or initiated manually by a user of the client device (e.g., where the user manually selects a television channel associated with one of the low-quality video programs).

As depicted in FIG. 3, if a channel change request is received, method 300 proceeds to step 330, and, if a channel change request is not received, method 300 proceeds to step 328. At step 328, the high-quality video program stream and low-quality video program streams continue to be provided to the client device using the high-quality and low-quality channels, respectively. From step 328, method 300 returns to step 326 (i.e., the high-quality video program stream and one or more low-quality video program streams continue to be provided to the client device until a channel change request is received, or, alternatively, until the client device is powered off).

At step 330, a video program associated with the requested channel is obtained. The video program associated with the requested channel is a high-quality video program. At step 332, the high-quality video program (i.e., third video program) is provided to the client device as a high-quality video program stream conveyed over the high-quality channel (i.e., as a third video program conveyed over the first channel). At step 334, the one or more low-quality video programs continue to be provided to the client device as respective low-quality video program streams conveyed over the low-quality channel. From step 334, method 300 returns to step 326 (i.e., the high-quality video program stream and low-quality video program streams continue to be provided to the client device until a channel change request is received, or, alternatively, until the client device is powered off).

Although primarily depicted and described herein with respect to specific numbers of high-quality video programs and low-quality video programs being provided using a specific configuration of low-quality and high-quality video programs streams and channels, the present invention may support various other configurations. In one embodiment, in which one of the low-quality video programs is provided to a client device as a high-quality video program over the high-quality channel, rather than continuing to provide the low-quality video program over the low-quality channel (which would be redundant), the low-quality video program in the low-quality channel may be replaced by one or more other low-quality video programs.

In one such embodiment, a last video program provided to, and presented at, the client device in high-quality format may continue to be provided to the client device in low-quality format using an associated low-quality video program stream conveying a low-quality version of the video program, thereby enabling more efficient switching by the user back to the previously watched video program. In another such embodiment, a low-quality video program previously provided in low-quality format as a low-quality video program stream that is conveyed over the low-quality channel, and currently being presented in high-quality format using a high-quality video program stream conveyed over the high-quality channel, may be replaced by at least one other preferred video program.

For example, if video programs associated with the top five preferred channels are typically provided in low-quality format over the low-quality channel, and the video program associated with the third most preferred channel is currently being provided in high-quality format over the high-quality channel, a video program associated with the sixth most preferred channel may be provided over the low-quality channel in place of the video program associated with the third most preferred channel (since continuing to provide the video program associated with the third most preferred channel as a low-quality video program stream while that video program is simultaneously provided and presented as a high-quality video program over the high-quality channel would be a redundant waste of network resources).

Figure 4:
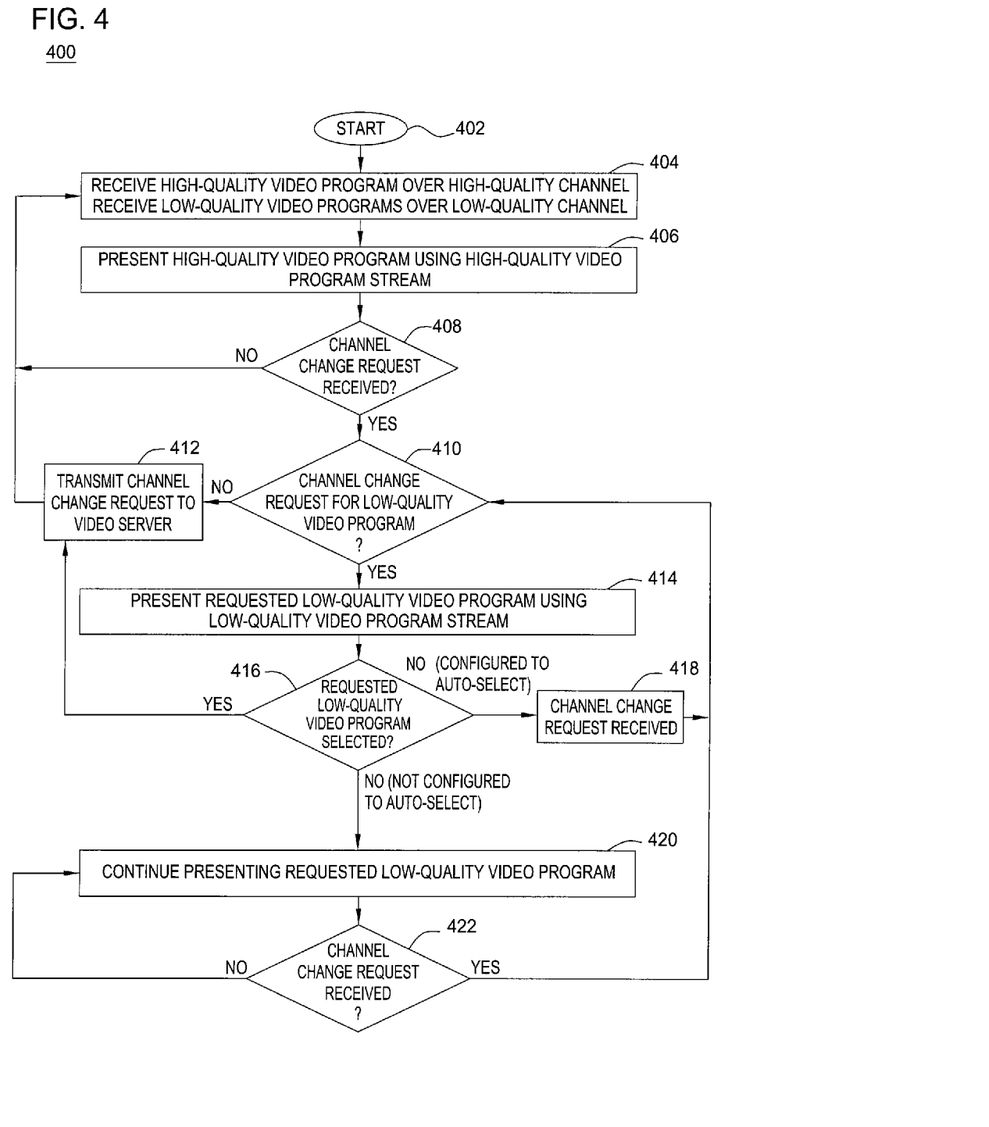
FIG. 4 depicts a method according to one embodiment of the present invention.

FIG. 4 depicts a method according to one embodiment of the present invention. Specifically, method 400 is a method for receiving, at a client device, a high-quality video program stream and one or more low-quality video program streams, presenting a high-quality video program conveyed by the high-quality video program stream, and locally switching from presenting the high-quality video program to presenting a low-quality video program conveyed by one of the low-quality video program streams (i.e., to provide, thereby, an improved channel change experience for users of the client device). Although primarily depicted and described herein as being performed serially, at least a portion of the steps of method 400 may be performed contemporaneously, or in a different order than presented in FIG. 4. The method 400 begins at step 402 and proceeds to step 404.

At step 404, a high-quality video program conveyed by a high-quality video program stream is received over a high-quality channel and one or more low-quality video programs conveyed by respective one or more low-quality video program streams are received over a low-quality channel. The high-quality video program stream and low-quality video program streams, which convey the respective high-quality video program and low-quality video programs, are received from a video server (as depicted and described with respect to FIG. 3). At step 406, the high-quality video program conveyed by the high-quality video program stream received over the high-quality channel is presented (e.g., on a display device such as a television, computer monitor, and the like).

At step 408, a determination is made as to whether a channel change request is received. The channel change request may be received from a user input device (e.g., remote control, keyboard, mouse, and the like). If a channel change request is not received, method 400 returns to step 404, at which point the high-quality video program and low-quality video programs conveyed by the high-quality video program stream and low-quality video program streams, respectively, continue to be received by the client device using the respective high-quality channel and low-quality channels, and, furthermore, the high-quality video program continues to be presented at the client device). If a channel change request is received, method 400 proceeds to step 410.

At step 410, a determination is made as to whether the channel change request is a request for one of the low-quality video programs conveyed by one of the low-quality video program streams received by the client device over the low-quality channel. If the channel change request is a request for one of the low-quality video programs received by the client device over the low-quality channel, method 400 proceeds to step 414. If the channel change request is not a request for one of the low-quality video programs received by the client device over the low-quality channel, method 400 proceeds to step 412.

At step 412, a channel change request is transmitted from the client device to the video server from which the high-quality and low-quality video program streams are received. Since the channel change request detected by the client device is for a channel that is not associated with one of the low-quality video program streams provided over the low-quality channel, in order to receive the video program stream associated with the requested channel, the client device transmits a channel change request upstream to the video server requesting that the video server provide the video program associated with the requested channel. A channel change request transmitted upstream from the client device to the video server may be transmitted in-band or out-of-band using any means of upstream communication.

As described herein, upon receiving a channel change request, the video server obtains the video program associated with the requested channel and provides the video program to the client device as a high-quality video program stream over the high-quality channel. The response of the video server to a channel change request received from a client device may be better understood with respect to FIG. 3. From step 412, method 400 returns to step 404, at which point high-quality video program stream and low-quality video program streams continue to be received by the client device using the high-quality and low-quality channels, respectively, and the high-quality video program conveyed by the high-quality video program stream continues to be presented).

At step 414, the low-quality video program conveyed by the low-quality video program stream associated with the selected channel is presented. The low-quality video program stream associated with the selected channel is identified in the low-quality channel. The presentation of a low-quality video program conveyed by one of the low-quality video program streams enables the user to preview the video program without initiating an upstream request to the video server for the video program, thereby enabling quicker and cheaper previewing of a subset of video programs available to the client device from the video server. Since the low-quality video program is already being provided to the client device in the low-quality channel, the user is thereby able to preview the low-quality video program using local processing (i.e., the client device locally selects the video program stream conveying the video program associated with the selected channel).

At step 416, a determination is made as to whether the low-quality video program (i.e., the low-quality video program presented at step 414) is selected. In one embodiment, the low-quality video program may be directly selected by a user of the client device (e.g., by actuating one or more buttons on a user interface device such as a remote control, keyboard, and the like). In one embodiment, the low-quality video program may be indirectly selected by a user of the client device (e.g., by remaining tuned to the low-quality video program stream in the low-quality channel for a period of time exceeding a threshold, e.g., ten seconds). Although described with respect to specific means for selecting a low-quality video program presented at a client device (i.e., selecting the low-quality video program such that the low-quality video program is switched to being presented as a high-quality video program), other means of selecting a video program may be used.

With respect to step 416, if the low-quality video program is selected, method 400 returns to step 412. As described herein, at step 412, a channel change request is transmitted from the client device to the video server from which the high-quality and low-quality video program streams are received. In this embodiment, since the low-quality video program has been selected, the client device transmits a channel change request upstream to the video server associated with the client device. The client device transmits the channel change request upstream to request that the video server provide a high-quality version of the selected video program for further presentation of the video program to the user of the client device.

With respect to step 416, if a low-quality video program is not selected (where the client device is configured to automatically select the low-quality video program after a threshold period of time), method 400 proceeds to step 418. At step 418, a channel change request is received. In this case, the channel change request may be received in one of a plurality of ways. In one embodiment, the channel change request is received as a direct request initiated by the user of the client device. In one embodiment, the channel change request is received as an indirect request initiated by the client device (e.g., if the low-quality program is presented on the client device for greater than a threshold length of time without the user initiating another channel change operation). From step 418, method 400 returns to step 410, at which point a determination is made as to whether or not the channel change request is a request for one of the low-quality video programs received by the client device over the low-quality channel.

With respect to step 416, if a low-quality video program is not selected (where the client device is not configured to automatically select the low-quality video program after a threshold period of time), method 400 proceeds to step 420. At step 420, since the low-quality video program is not selected (for the purpose of receiving a high-quality version of the low-quality video program), and since the client device is not configured to automatically select the low-quality video program after a threshold period of time, the client device continues to present the low-quality video program to the user of the client device. From step 420, method 400 proceeds to step 422.

At step 422, a determination is made as to whether or not a channel change request is received. If a channel change request is not received, method 400 returns to step 420 (i.e., since the client device is not configured to automatically select video programs, the client device continues to present the low-quality video program to the user of the client device until a channel change request is received). If a channel change request is received, method 400 returns to step 410, at which point a determination is made as to whether or not the channel change request is a request for one of the low-quality video program streams received by the client device over the low-quality channel (or a request for a channel providing a video program other than the high-quality video program and low-quality video programs).

In other words, as described herein, the present invention enables a significant improvement in the television viewing experience of a user as the user changes channels. By providing additional programs to a client device in a low-quality format, the user of the client device is able to preview additional programming choices with quicker channel changes because requests to preview video programs provided in the low-quality format do not require upstream requests to a video server (rather, requests to view video programs provided in the low-quality format may be served by the client device locally). The operation of a client device and an associated video server in using the present invention may be better understood with respect to the following example.

In one example, assume that CD $130_2$ receives a video stream for the television program currently airing on ESPN over high-quality channel 202. In this example, further assume that the user associated with CD $130_2$ set up a "favorites" channel list including CBS, NBC, FOX, ABC, HBO, TNT, and TBS. In this example, assume that CD $130_2$ receives video streams for television programs currently airing on CBS, NBC, FOX, ABC, HBO, TNT, and TBS in grayscale (i.e., as low-quality programs) over low-quality channel 204. In this example, assume that, upon the start of a commercial on ESPN, the user begins switching between the television programs on CBS, NBC, FOX, ABC, HBO, TNT, and TBS.

In continuation of this example, upon determining that the user decides to watch a television program airing on one of the television channels CBS, NBC, FOX, ABC, HBO, TNT, and TBS provided by low-quality channel 204 (e.g., user explicitly provides an indication of the selection, or CD $130_2$ detects that the user remains tuned to one of the television channels for a length of time greater than a threshold), CD $130_2$ provides an indication to VS 110 of the television channel that the user has selected. In this example, assume that the user decides to watch the program airing on ABC. In this example, CD $130_2$ provides an indication of the selection of ABC to VS 110.

In continuation of this example, upon receiving the indication of the selection of ABC by the user, VS 110 identifies a high-quality version of the video program stream for the television program currently airing on ABC and provides the high-quality version of the video program stream to CS $130_2$ using high-quality channel 202. In other words, VS 110 switches from providing an ESPN video program stream over high-quality channel 202 to providing an ABC video program stream over high-quality channel 202. The VS 110 continues to provide low-quality versions of the television programs currently airing television channels CBS, NBC, FOX, ABC, HBO, TNT, and TBS using low-quality channel 204.

In continuation of this example, as described herein, in addition to continuing to provide low-quality versions of the television programs currently airing on television channels CBS, NBC, FOX, ABC, HBO, TNT, and TBS, VS 110 may also provide a low-quality version of another television program currently airing on another television channel. In other words, since the user is currently viewing a high-quality version of a television program airing on one of the television channels typically provided by the low-quality channel, there is available capacity in the low-quality channel for supporting an additional low-quality video program.

As described herein, in one embodiment, the additional low-quality video program provided over the low-quality channel may be the television channel previously provided over the high-quality channel 202 (which in this example is the program airing on ESPN). In other words, in this example, ABC is swapped for ESPN in the low-quality channel. This enables the user to quickly zap back to the last channel that the user was watching in high-quality format. As described herein, in another embodiment, the additional low-quality video program provided over the low-quality channel may a different television channel determined using the user profile associated with the user. In this embodiment, for example, a television program associated with a next-most-preferred television channel (e.g., USA), as determined from the user profile, is provided over the low-quality channel.

Figure 5:
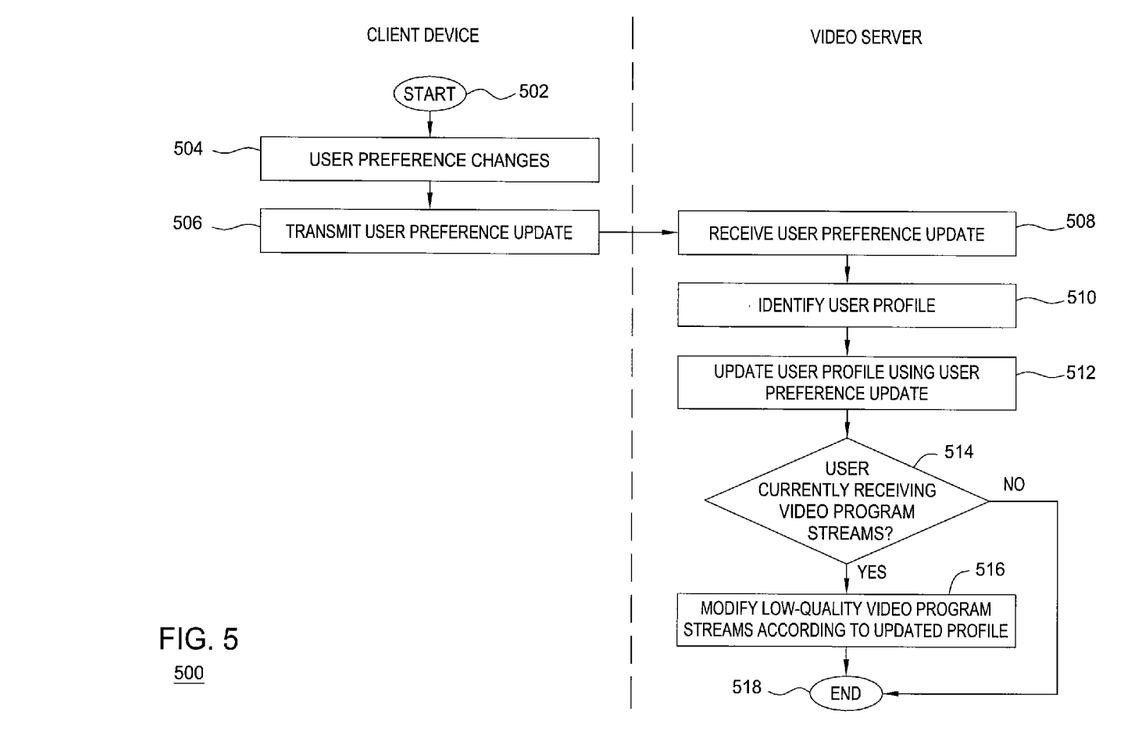
FIG. 5 depicts a method according to one embodiment of the present invention.

FIG. 5 depicts a method according to one embodiment of the present invention. Specifically, method 500 is a method for updating user preference information associated with a user of a client device (e.g., channel preference information, program preference information, and the like, as well as various combinations thereof). Although primarily depicted and described with respect to user preference information, preference information associated with one or more of a household, one or more client devices, one or more users, and the like, may be updated. Although primarily depicted and described herein as being performed serially, at least a portion of the steps of method 500 may be performed contemporaneously, or in a different order than presented in FIG. 5. The method 500 begins at step 502 and proceeds to step 504.

At step 504, a user preference changes at a client device. The user preference change may include a change in a list of channels preferred by one or more users of the client device. Although primarily described with respect to a list of channels preferred by one or more users of a client device, in other embodiments, preference information may include other information. At step 506, a user preference update is transmitted from the client device to an associated video server (or, alternatively, to one or more other network elements adapted to store preference information for use by a video server in providing low-quality video programs to client devices).

In one embodiment, a user preference change is initiated manually by a user of the client device. In one such embodiment, for example, the user may update a "favorite channels" list (e.g., using a television remote control or a computer mouse/keyboard). In one embodiment, a user preference change is detected automatically by the client device. In one such embodiment, the client device may be adapted to automatically obtain and maintain information indicative of channels preferred by the user. The information indicative of channels preferred by a user may be obtained by the client device according to the amount of time the client device is tuned to each video channel, the number of times the user selects each video channel, and the like, as well as various combinations thereof.

Although primarily depicted and described herein with respect to an embodiment in which a user preference change is communicated from a client device to a video server, in one embodiment, a user preference change may be automatically detected by a video server, or may be automatically detected by another network device and communicated to the video server. A user preference change indicative of a change in the channels preferred by a user of a client device may be detected by monitoring the viewing habits of one or more users associated with the client device, e.g., according to the number of times each video channel is requested by the user (e.g., monitoring channel change requests from the client device), the amount of time the client device is tuned to each video channel, and the like, as well as various combinations thereof.

At step 508, the user preference update is received by the video server. At step 510, a user profile is identified. At step 512, the identified user profile is updated using the user preference update received from the client device. For example, if the user preference update includes a list of preferred television channels, a previously stored list of preferred television channels associated with the user profile is updated using the newly identified list of preferred television channels, or, alternatively, is replaced by the newly identified list of preferred television channels.

At step 514, a determination is made as to whether the client device associated with the user profile is currently receiving video program streams from the video server. If the client device associated with the user profile is not currently receiving video program streams from the video server, method 500 proceeds to step 518, where method 500 ends. If the client device associated with the user profile is currently receiving video program streams from the video server, method 500 proceeds to step 516. At step 516, the low-quality video programs provided from the video server to the client device are modified according to the updated user profile. At step 518, method 500 ends.

Although primarily depicted and described herein as being adapted for use in any video distribution system, it will be appreciated that the invention may be particularly suited for use in video distribution systems in which capacity between the video servers and client devices is limited (i.e., for use in video distribution systems in which all channels cannot be provided to a client device simultaneously such that a channel selection by a user of the client device merely involves tuning to a new channel on which the desired program is being broadcast). For example, the present invention may be particularly suited for use in digital television distribution networks in which video programs are provided in high-definition quality, IPTV networks where capacity between video servers and client devices may prevent all channels from being provided to client devices simultaneously, and the like, as well as various combinations thereof.

Although primarily depicted and described herein with respect to one video server, video programs may be available from multiple video servers, and multiple video servers may be used for providing video programs to client devices. Although primarily depicted and described herein with respect to a video distribution network, various different video distribution networks may be used for conveying video programs from one or more video servers to client devices available from the video distribution networks. As such, the present invention is not intended to be limited by the numbers of, or configurations of, video servers, video distribution networks, or other network components used for providing high-quality and low-quality video programs in accordance with the present invention.

Although primarily depicted and described herein with respect to one high-quality channel having one high-quality video program stream conveying one high-quality video, in other embodiments, one or more high-quality video channels may be used to provide one or more high-quality video program streams conveying one or more high-quality video programs. Although often depicted and described herein with respect to one low-quality channel, in other embodiments, multiple low-quality video channels may be used to provide multiple low-quality video program streams conveying multiple low-quality video programs. Although primarily depicted and described herein with respect to two quality levels, in other embodiments, additional quality levels may be defined such that video programs may be provided to client devices using three or more levels of quality.

Although primarily depicted and described herein with respect to selection of video programs, or, similarly, video program streams conveying video programs, such selections of video programs or video program streams may be effected by selecting television channels associated with the video programs (e.g., using channel change operations initiated via a user interface component such as a remote control for a television, a mouse and keyboard for a computer, and the like, as well as various combinations thereof). In other words, selection of video programs or video program streams may, in some embodiments, be equivalently thought of as selection of the television channels (or streaming Internet video channels, and the like) associated with the video programs conveyed by the video program streams.

Although primarily depicted and described herein with respect to an embodiment in which only one video program is presented at a client device at a time, in other embodiments, the present invention may be utilized in order to simultaneously present multiple video programs at a client device. In one embodiment, for example, the present invention may be utilized in support of a multi-video display function (e.g., picture-in-picture function on a television, multiple video display windows on a computer, and the like). In one such embodiment, for example, while the high-quality video program is presented in a primary display portion of a client device, a user associated with the client device may simultaneously display one or more of the low-quality video programs using one or more secondary display portions of the client device (e.g., using one or more picture-in-picture display portions on a television, one or more video display windows on a computer monitor, and the like)).

Figure 6:
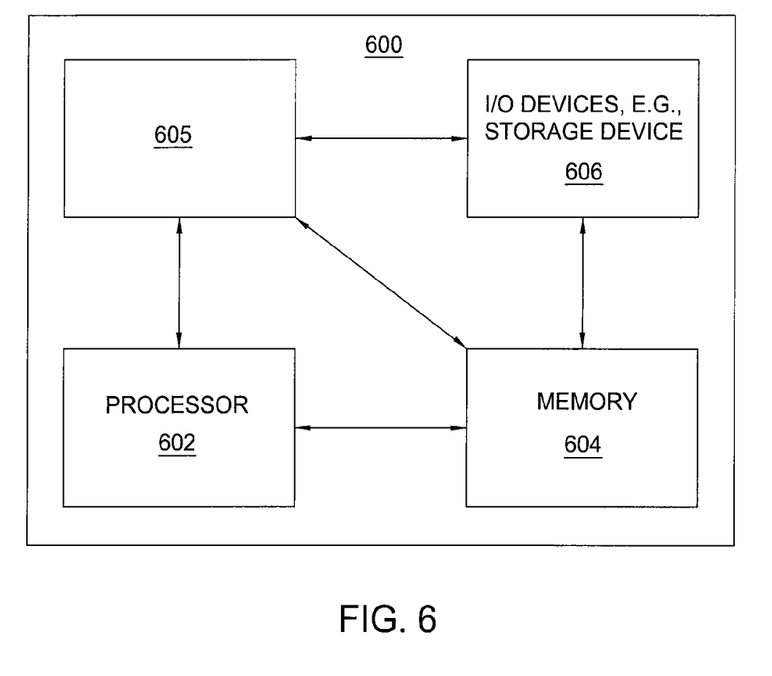
FIG. 6 depicts a high-level block diagram of a general-purpose computer suitable for use in performing at least a portion of the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), a channel distribution/selection module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

The present invention may be implemented in software and/or in a combination of software and hardware, e.g., using application specific integrated circuits (ASIC), a general purpose computer or any other hardware equivalents. In one embodiment, the present channel distribution/selection module or process 605 can be loaded into memory 604 and executed by processor 602 to implement the functions as discussed above. Thus, channel distribution/selection process 605 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method of receiving video programs at a client device, wherein the video programs are received from a video server via a video distribution network, the method comprising:
   receiving, from the video server via a first channel of the video distribution network, a first video program stream conveying a first video program at a first quality level;
   receiving, from the video server via a second channel of the video distribution network, a plurality of second video program streams conveying a respective plurality of second video programs at a second quality level below the first quality level, wherein at least one of the second video program streams received over the second channel is included within the second plurality of video program streams based on preference information;
   in response to a channel change operation by which a user selects one of the second video program streams, locally switching from presenting the first video program at the first quality level to presenting, at the second quality level, the second video program conveyed by the selected one of the second video program streams; and
   when the selected one of the second video programs is further selected at the client device during presentation of the selected one of the second video programs at the client device using the second quality level, propagating a channel change request from the client device toward the video server, wherein the channel change request is a request for the video server to provide the selected one of the second video programs at the first quality level, wherein the further selection of the selected one of the second video programs at the client device is an automatic selection made in response to a determination that the selected one of the second video programs is presented at the client device for a threshold length of time.

2. The method of claim 1, further comprising:
   transmitting preference information toward the video server, wherein the preference information comprises an indication of a television channel preferred by a user associated with the client device.

3. The method of claim 2, wherein the television channel preferred by the user associated with the client device is determined in response to one of a manual selection of the preferred television channel by the user or an automatic determination by the client device that the television channel is preferred by the user.

4. The method of claim 1, wherein the first quality level comprises one of a high-definition television format or a standard-definition television format;
   wherein, if the first quality level comprises the high-definition television format, the second quality level comprises one of the standard-definition television format or a below-standard definition television format; or
   wherein, if the first quality level comprises the standard-definition television format, the second quality level comprises a below-standard definition television format.

5. An apparatus configured to receive video programs at a client device from a video server via a video distribution network, the apparatus comprising:
   a processor and a memory communicatively connected to the processor, the processor configured to:
      receive, from the video server via a first channel of the video distribution network, a first video program stream conveying a first video program at a first quality level;
      receive, from the video server via a second channel of the video distribution network, a plurality of second video program streams conveying a respective plurality of second video programs at a second quality level below the first quality level, wherein at least one of the second video program streams received over the second channel is included within the second plurality of video program streams based on preference information;
      in response to a channel change operation by which a user selects one of the second video program streams, locally switch from presenting the first video program at the first quality level to presenting, at the second quality level, the second video program conveyed by the selected one of the second video program streams; and
      when the selected one of the second video programs is further selected at the client device during presentation of the selected one of the second video programs at the client device using the second quality level, propagate a channel change request from the client device toward the video server, wherein the channel change request is a request for the video server to provide the selected one of the second video programs at the first quality level, wherein the further selection of the selected one of the second video programs at the client device is an automatic selection made in response to a determination that the selected one of the second video programs is presented at the client device for a threshold length of time.

6. The apparatus of claim 5, wherein the processor is configured to:
transmit preference information toward the video server, wherein the preference information comprises an indication of a television channel preferred by a user associated with the client device.

7. The apparatus of claim 6, wherein the television channel preferred by the user associated with the client device is determined in response to one of a manual selection of the preferred television channel by the user or an automatic determination by the client device that the television channel is preferred by the user.

8. The apparatus of claim 5, wherein the first quality level comprises one of a high-definition television format or a standard-definition television format;
wherein, if the first quality level comprises the high-definition television format, the second quality level comprises one of the standard-definition television format or a below-standard definition television format; or
wherein, if the first quality level comprises the standard-definition television format, the second quality level comprises a below-standard definition television format.

9. A non-transitory computer-readable storage medium storing instructions which, when executed by a processor, cause the processor to perform a method of receiving video programs at a client device, wherein the video programs are received from a video server via a video distribution network, the method comprising:
receiving, from the video server via a first channel of the video distribution network, a first video program stream conveying a first video program at a first quality level;
receiving, from the video server via a second channel of the video distribution network, a plurality of second video program streams conveying a respective plurality of second video programs at a second quality level below the first quality level, wherein at least one of the second video program streams received over the second channel is included within the second plurality of video program streams based on preference information;
in response to a channel change operation by which a user selects one of the second video program streams, locally switching from presenting the first video program at the first quality level to presenting, at the second quality level, the second video program conveyed by the selected one of the second video program streams; and
when the selected one of the second video programs is further selected at the client device during presentation of the selected one of the second video programs at the client device using the second quality level, propagating a channel change request from the client device toward the video server, wherein the channel change request is a request for the video server to provide the selected one of the second video programs at the first quality level, wherein the further selection of the selected one of the second video programs at the client device is an automatic selection made in response to a determination that the selected one of the second video programs is presented at the client device for a threshold length of time.

10. The non-transitory computer-readable storage medium of claim 9, the method further comprising:
transmitting preference information toward the video server, wherein the preference information comprises an indication of a television channel preferred by a user associated with the client device.

11. The non-transitory computer-readable storage medium of claim 10, wherein the television channel preferred by the user associated with the client device is determined in response to one of a manual selection of the preferred television channel by the user or an automatic determination by the client device that the television channel is preferred by the user.

12. The non-transitory computer-readable storage medium of claim 9, wherein the first quality level comprises one of a high-definition television format or a standard-definition television format;
wherein, if the first quality level comprises the high-definition television format, the second quality level comprises one of the standard-definition television format or a below-standard definition television format; or
wherein, if the first quality level comprises the standard-definition television format, the second quality level comprises a below-standard definition television format.

* * * * *